C. L. McKENZIE.
EXCAVATING SCOOP OR DIPPER.
APPLICATION FILED NOV. 15, 1909.
967,819.
Patented Aug. 16, 1910.
2 SHEETS—SHEET 1.
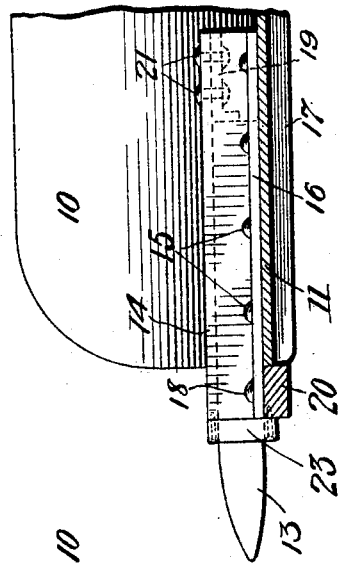
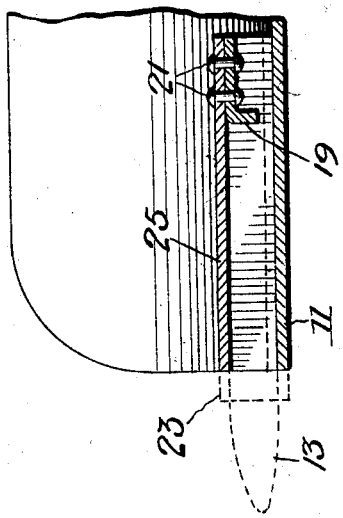
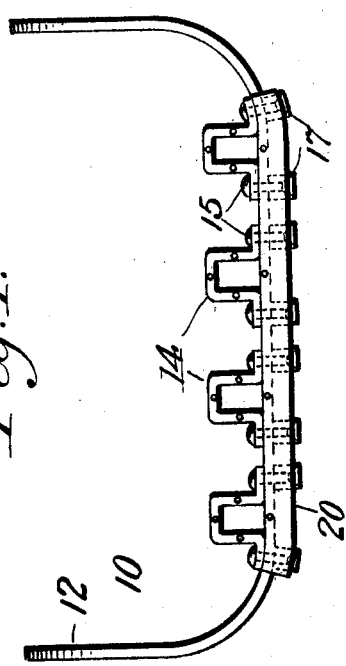
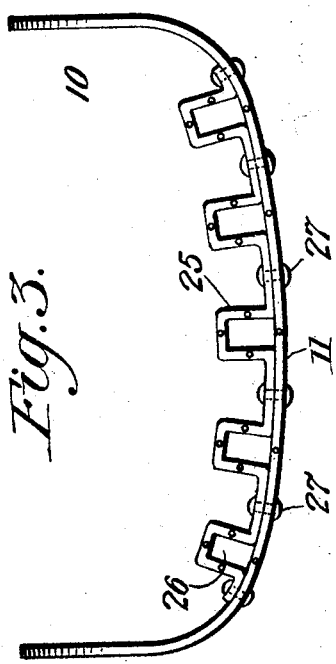

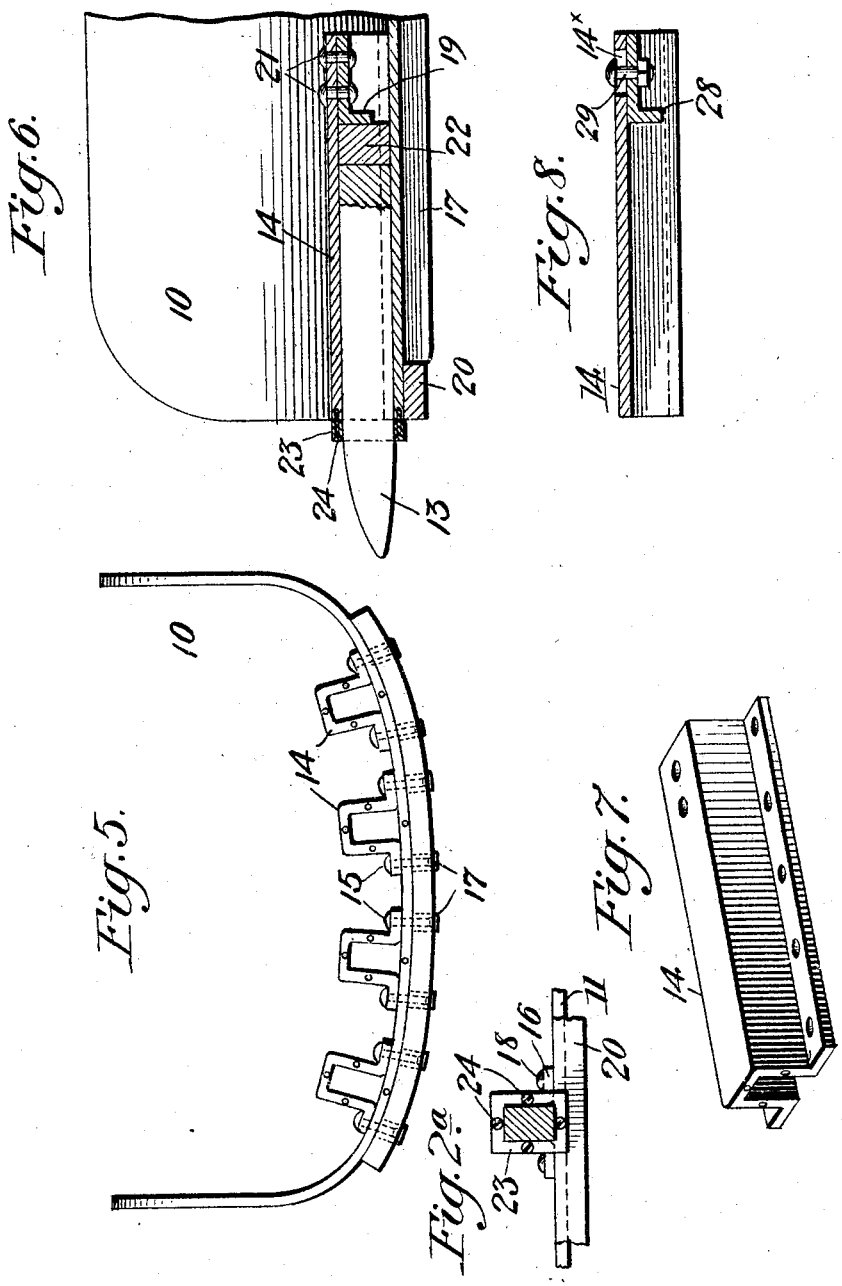

UNITED STATES PATENT OFFICE.

CHARLES L. McKENZIE, OF PITTSBURG, PENNSYLVANIA.

EXCAVATING SCOOP OR DIPPER.

967,819.	Specification of Letters Patent.	Patented Aug. 16, 1910.

Application filed November 15, 1909. Serial No. 528,042.

*To all whom it may concern:*

Be it known that I, CHARLES L. MCKENZIE, a citizen of the United States, and resident of Pittsburg, county of Allegheny, and State of Pennsylvania, have invented certain new and useful Improvements in Excavating Scoops or Dippers; and I do hereby declare the following to be a full, clear, and exact description of the invention, such as will enable others skilled in the art to which it appertains to make and use the same.

This invention relates to shovels, scoops or dippers that are used for excavating purposes, and has particular reference to the construction, means of attachment and arrangement of the teeth that are often applied to the forward edge of a steam shovel or scoop where it enters the earth or other material to be excavated.

The advantages of using cutting teeth in the connection indicated are well known, but heretofore constructions of this kind have involved the provision of teeth and teeth attaching means of complicated form which it is difficult and expensive to manufacture and to renew when worn out. Also, it has been found that when the cutting teeth are applied to the shovel or dipper bottom in the customary way the strain that is exerted on the teeth causes such bottom to be bent out of shape, and again the various methods of applying the teeth have had the defect that they do not provide for the adjustment of the latter as they become worn, nor their ready application to and detachment from the shovel or dipper.

The object of the present invention is to overcome these drawbacks and provide a better and cheaper means of attachment for the teeth or points; a construction in which the dipper shell or shovel is strongly reinforced at its forward edge; and improved means for bracing that part of the dipper or shovel most subject to wear and strain, in such a way as to prolong the use of the device without repairs and greatly reduce the expense of these repairs when needed.

In the accompanying drawing:—Figure 1 is a front elevation of a shovel or dipper construction involving the invention, the teeth being removed; Fig. 2 is a longitudinal section through the bottom of the dipper; Fig. 2ª is a detail front view showing one of the teeth in position; Figs. 3 and 4 are views corresponding to Figs. 1 and 2, but illustrating a modified form of the construction; Figs. 5 and 6 illustrate a still further modified form; Fig. 7 is a detail perspective view of one of the keepers or holders for the teeth; and Fig. 8 is a longitudinal section through a holder or keeper with a modified form of stop in connection therewith.

In the drawing, the dipper or shovel 10 is illustrated as being of scoop shaped form, having a flat bottom 11 and upright side walls 12, but I wish it to be distinctly understood that the form of the shovel or dipper is wholly immaterial to the invention, which resides solely in the construction and arrangement of the cutting teeth and that particular part of the shovel or dipper to which they are applied.

In the form of the device illustrated in Figs. 1, 2 and 2ª, the teeth 13 are frictionally held in a series of sockets formed by U-shaped keepers or holders that are riveted to the bottom 11. Said keepers or holders 14 are placed side by side in parallel relation and are riveted by means of rivets 15 that pass through their outstanding laterally directed base flanges 16. Applied to the under surface of the shovel bottom at points beneath the base flanges of the holders or sockets are the usual reinforcing ribs or shoes 17, and it will be noted that these are held in place by means of the rivets 15 which pass down through the base flanges, the bottom and said shoes, as appears from Fig. 1. In this form of the device, the U-shaped plates or holders 14 extend forward of the shovel bottom to a certain extent, and their forward overhanging or projecting ends are riveted or otherwise suitably secured, as indicated at 18, to a reinforcing bar or cross strip 20 that extends beneath all of the keepers and abuts at its rear edge against the front edge of the shovel bottom. In the embodiment illustrated, said reinforcing bar 20 is shown as of about twice the thickness of the bottom, and I find that this construction is a very good one for strongly reinforcing the shovel or dipper at its forward edge, where the strain on the teeth is transmitted to it during excavation, but it is apparent that the precise arrangement illustrated need not be adhered to under all conditions.

As previously intimated, the teeth 13 are held by friction in the sockets or pockets created by the U-shaped plates or holders, and this is effected by driving said teeth into their sockets, in which they do not fit tightly. The opening of the socket should be fractionally larger than the tooth, so that the tooth can be inserted without hard driving and also removed easily. The tooth may be held firmly enough to prevent its falling out when the shovel bottom is tilted forward, by driving in a small wooden or metal wedge. A nail will answer the purpose. When once put in place the teeth will not become dislodged during excavation for the reason that the digging action always tends to force them back and wedge them in their sockets, as will be understood. At the rear of each keeper or holder there is provided an interior stop 19 to prevent the tooth from working too far back, and said stop preferably takes the form of an angle piece such as that illustrated, riveted to the holder top, as indicated at 21. This arrangement is also shown in Figs. 4 to 6, and in the latter figure it is indicated how a filler block 22 may be interposed between the fixed stop and the butt end of the tooth as the latter becomes worn.

As a protection to prevent wear of the front end of each keeper plate 14 and of the forward edge of the protecting or reinforcing bar 20, I provide a washer 23 that slips over the tooth and bears against the forward edges of the corresponding keeper plate and reinforcing bar, as shown in Figs. 2 and 2ᵃ. Said washer can be secured in place by any suitable means, for instance, the small screws 24 that are screwed into the keeper plate and reinforcing bar in horizontal direction.

By the construction described, the forward edge of the shovel or dipper bottom is not only reinforced in a very simple and effective manner, but also this reinforcement forms a part of the teeth attaching means, so that there is a firm and durable connection between the teeth and the shovel bottom combined with the advantage that the strain exerted on the teeth is so transmitted to the shovel bottom and distributed that there can be no bending of the latter. The manner of attaching the shoes 17 is also factitive in bringing about these results, as the shovel bottom is not only reinforced and protected at its top surface and front edge but also at its lower surface. It will be manifest that during excavation the prying pressure on the shovel teeth that takes place when a load is scooped up in the shovel or dipper is transferred to the reinforcing bar and the keeper plates rather than to the edge of the dipper shell.

It is to be understood that the cross sectional form of the cutting teeth is entirely immaterial to the invention, and that the keeper plates and washers are made to conform to the teeth. The fact that these latter are of simple form and can be very readily attached and detached will appeal to those who realize the importance of these features. The keeper plates, which are the parts of my device requiring the most work to replace, will not wear or become broken or deformed as readily as other ordinarily used devices, and, therefore, will less frequently need to be replaced. It is also evident that the manufacture of the reinforcing bar, keeper plates and other parts can be readily effected at small cost, and that the reinforcing bar, which takes the frictional wear between the teeth, can readily and cheaply be replaced, whereas, in the most common form of dipper, the lip (a large, heavy, forged curved plate) is expensive both to buy and to attach. My improved system of attachment is adapted to shovels of widely varying types, irrespective of their provision with the ordinary protecting lips usually employed.

In Figs. 3 and 4, I have indicated a modified construction in which the reinforcing bar and the shoes are omitted, the sockets for the teeth extending up to, but not beyond, the forward edge of the dipper bottom. In this case, the sockets are formed in a single continuous plate 25 that is bent to form U-shaped pockets 26 at intervals. Said plate is secured to the dipper bottom 11 by means of rivets 27 that pass through the plate and bottom at points between the sockets or pockets, whereby a certain reinforcement on the lower surface of the shovel or dipper is afforded. In this form, the teeth 13 are driven into the sockets in the usual way, against the stops 19, the washer 23 being placed next to the plate 25 and dipper bottom at the forward edges of the latter.

In the form shown in Figs. 5 and 6, the arrangement is similar to that shown in Figs. 1 and 2 with the exception that the keeper plates 14 extend up to and not beyond, the forward edge of the shovel or dipper, the reinforcing bar 20 being applied to the lower surface of the shovel bottom instead of in advance of the same. Of course, this necessitates the setting back of the reinforcing shoes 17 to a certain extent, but they extend into abutment at their forward ends with the reinforcing bar, just as before.

Instead of using a fixed stop 19 at the butt of each tooth and inserting a filler block 22 when the tooth becomes worn, I may employ an adjustable stop 28, as indicated in Fig. 8, so that the tooth, as it becomes worn, may be adjusted in forward direction. In the embodiment illustrated, the stop 28 is formed of an angle piece, as before, the adjustment being effected by means of a nutted bolt 29 carried by the angle piece and movable in a longitudinal slot 14ˣ in the top of the keeper plate or tooth holder. In this way, the use of a filler block is dispensed with.

One of the important features of the invention is the application of the holder or keeper plate to one surface of the shovel taken in connection with the fact that the tooth that is inserted in such holder or keeper plate lies wholly on said surface of the shovel or substantially so, without it being necessary to bifurcate or slit the tooth so that it will engage the bottom at opposite surfaces.

It is apparent that I have not attempted to describe all of the various modifications of the construction that may be adopted without digressing from my inventive idea.

What I claim is:—

1. The combination with a dipper bottom, of a U-shaped holder plate having base flanges riveted to said bottom, a tooth inserted between said plate and the dipper bottom, and an interior stop within the holder plate to limit the rearward movement of the tooth.

2. The combination with a dipper bottom, of a U-shaped holder plate having base flanges riveted to said bottom, a tooth inserted between said plate and the dipper bottom, and an interior stop within the holder plate to limit the rearward movement of the tooth, said stop comprising an angle piece applied to the top of the holder plate.

3. In a dipper construction, a dipper bottom, a U-shaped holder plate projecting beyond the forward edge of said bottom, and a tooth inserted in said holder plate.

4. In a dipper construction, a dipper bottom, a holder plate applied to the upper surface thereof, and extending beyond the forward edge of said bottom, a tooth held by said plate, and a reinforcing bar to which the forward end of the holder plate is secured.

5. In a dipper construction, a dipper bottom, a holder plate applied to the upper surface thereof, a tooth held by the holder plate, and a reinforcing bar extending across the forward end of the dipper beneath the holder plate.

6. In a dipper construction, a dipper bottom, a holder plate applied to one surface thereof and affording a socket, a tooth held in said socket, a reinforcing bar extending beneath the forward end of the holder plate, and a reinforcing rib or shoe applied to the surface of the bottom that is opposite the holder plate.

7. In a dipper construction, a dipper bottom, a holder plate applied to one surface thereof and affording a socket, a tooth held in said socket, a reinforcing bar extending beneath the forward end of the holder plate, and a reinforcing rib or shoe applied to the surface of the bottom that is opposite the holder plate and extending into abutment with the reinforcing bar.

8. The combination with a dipper bottom, of a plurality of U-shaped tooth holders or keepers applied to one surface thereof, and a common reinforcing bar extending along the forward edge of the dipper bottom and to which said holders or keepers are secured.

9. In a dipper construction, a dipper bottom, a plurality of holders or keepers applied to the upper surface thereof, and a common reinforcing bar extending along the forward edge of the dipper bottom beneath said keepers or holders.

10. In a dipper construction, a dipper bottom, a holder plate applied to the upper surface thereof, a reinforcing bar extending along the edge of the bottom beneath said holder plate, a tooth secured between the holder plate and the dipper bottom, and a washer surrounding the tooth and abutting against the forward edge of the holder plate.

11. In a dipper construction, a dipper bottom, a holder plate applied to the upper surface thereof, a reinforcing bar extending along the edge of the bottom beneath said holder plate, a tooth secured between the holder plate and the dipper bottom, and a washer surrounding the tooth and secured to the forward edges of the holder plate and reinforcing bar.

12. In a dipper construction, a dipper bottom, a holder plate applied to the upper surface thereof and extending beyond the forward edge of said bottom, and a reinforcing bar extending along and in abutment with said forward edge and secured to the holder plate where it overhangs the dipper bottom.

13. In a dipper construction, a dipper bottom, a tooth holding plate or keeper having flanges lying on one surface of the bottom, reinforcing shoes at the opposite surface of the bottom, and rivets that secure both the keeper flanges and the shoes to the dipper bottom.

14. In a dipper construction, a dipper bottom, a U-shaped holder plate at the upper surface thereof and provided with base flanges, shoes or reinforcing ribs beneath the dipper bottom and in line with said base flanges, and rivets that pass through the base flanges, the dipper bottom, and the shoes.

15. The combination of a holder applied to a shovel bottom and affording a socket, a tooth held in said holder, and means within the rear part of the holder to regulate the forward adjustment of the tooth, to compensate for wear.

In testimony whereof I affix my signature, in presence of two witnesses.

CHARLES L. McKENZIE.

Witnesses:
T. C. HICKSON,
JNO. M. TAYLOR.